G. MAALE.
METER CONNECTION.
APPLICATION FILED OCT. 11, 1920.
1,371,041.
Patented Mar. 8, 1921.
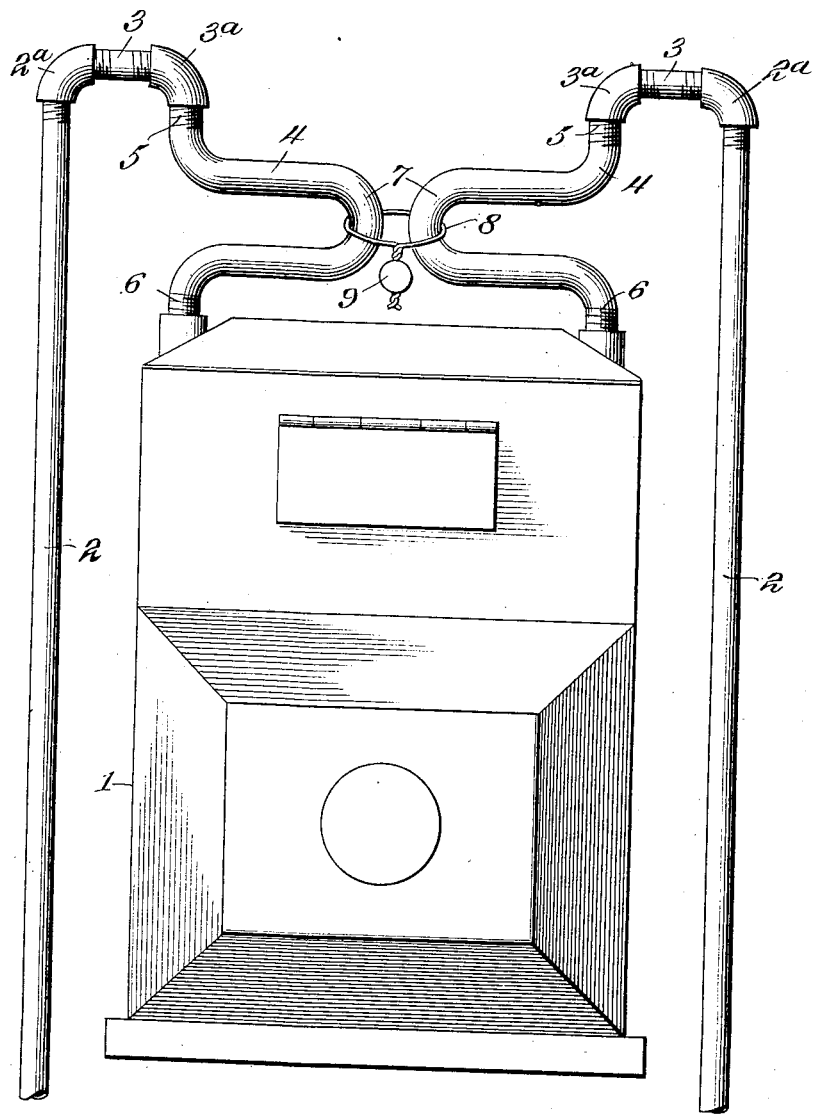
INVENTOR
Gerhard Maale
BY
James J Sheehy
ATTORNEYS

UNITED STATES PATENT OFFICE.

GERHARD MAALE, OF NEW ORLEANS, LOUISIANA.

METER CONNECTION.

1,371,041.  Specification of Letters Patent.  Patented Mar. 8, 1921.

Application filed October 11, 1920. Serial No. 416,192.

*To all whom it may concern:*

Be it known that I, GERHARD MAALE, a citizen of the United States, residing at New Orleans, in the parish of Orleans and State of Louisiana, have invented new and useful Improvements in Meter Connections, of which the following is a specification.

My present invention pertains to connections for meters, such for instance those that are used for registering the consumption of artificial gas and the like, and it contemplates provision of a connection whereby fraudulent use of gas or tampering with the pipes leading to the meter are effectually precluded.

The invention further contemplates the provision of a simple and ready connection between the inlet and outlet pipes of the meter.

The invention in all of its details will be fully understood from the following description and claims when the same are read in connection with the accompanying drawings forming part of this specification.

The drawings represent a meter as properly connected with the inlet and outlet pipes by means of my novel connection; said view being a front elevation of meter, pipes and connection.

The meter 1 and inlet and outlet pipes 2 are of the ordinary well known construction, and the said pipes are provided with the elbows 2ª at their upper ends. Threaded in the elbows 2ª are short nipples 3 and at their opposite ends the nipples 3 are threaded to elbows 3ª.

Threaded to the meter at its upper end are my novel key pipes or connections 4 that are constructed somewhat in the shape of a U and said pipes 4 are provided with left hand threads 6 at their lower end where they are secured to the meter and with right hands threads 5 at their upper end where they are secured to the elbows 3ª.

The inner curved portions 7 of the key pipes 4 are encircled by a cable 8 that is locked by the seal 9 as illustrated. This seal may be stamped or otherwise marked for identification purposes.

It will be apparent from the foregoing that because of the right and left hand threads 5 and 6 of the key pipes 4 only a slight movement of the pipes will be sufficient to retain the meter in its proper position.

Moreover, should an unscrupulous person endeavor to surreptitiously use the gas it will be necessary to remove the seal in order to break the connection between the meter and pipes 4 and this would be attended by detection on the part of those employing my novel connection.

It will be manifest that the invention is simple in construction and operation and the use of universal joints is dispensed with and the employment of right and left hand threads throughout prevents possibility of removing any pipes and connections until the seal is broken.

Having described my invention, what I claim and desire to secure by Letters-Patent is—

1. In means for the purpose set forth, the combination of a meter, connections secured to the meter, and supply pipes secured to the connections; said connections being of approximately U-shape and having left hand threads at their lower ends and right hand threads at their upper ends.

2. In means for the purpose set forth the combination with a meter, connections having lower left hand threads by which they are secured to said meter, right hand threads provided on the upper end of the connections, elbows threaded on the last named end of the connections, nipples secured to the elbows, other elbows secured on the nipples, inlet and outlet supply pipes secured to the last named nipples and a cable encircling the connections and having its ends sealed whereby slight movement of the connections with respect to the meter will be attended by breaking of the seal.

3. In means for the purpose set forth, the combination of a gas meter, pipes arranged adjacent the meter, connections interposed between and connected with the meter pipes, and a seal encircling the connections; said connections being so constructed and arranged that slight movement of the connections with respect to the meter will be attended by breaking of the seal.

In testimony whereof I have hereunto set my hand in presence of two subscribing witnesses.

GERHARD MAALE.

Witnesses:
 CARL A. CONRAD,
 FRANK J. GRUNEWALD.